US011711619B2

(12) United States Patent
Kogure et al.

(10) Patent No.: US 11,711,619 B2
(45) Date of Patent: Jul. 25, 2023

(54) CONTROLLING EXPOSURE BASED ON INVERSE GAMMA CHARACTERISTIC

(71) Applicant: CANON KABUSHIKI KAISHA, Tokyo (JP)

(72) Inventors: Kentaro Kogure, Tokyo (JP); Toshiyuki Dobashi, Kanagawa (JP); Seiya Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/461,669

(22) Filed: Aug. 30, 2021

(65) Prior Publication Data

US 2022/0078321 A1 Mar. 10, 2022

(30) Foreign Application Priority Data

Sep. 9, 2020 (JP) ................. 2020-151173

(51) Int. Cl.
*H04N 23/70* (2023.01)
*H04N 1/407* (2006.01)
*H04N 23/611* (2023.01)
*H04N 101/00* (2006.01)

(52) U.S. Cl.
CPC ............ *H04N 23/70* (2023.01); *H04N 1/407* (2013.01); *H04N 23/611* (2023.01); *H04N 2101/00* (2013.01); *H04N 2201/0084* (2013.01)

(58) Field of Classification Search
CPC ........... H04N 5/23203; H04N 5/23209; H04N 5/23218–23219; H04N 5/235–243; H04N 1/407–4078; H04N 23/61; H04N 23/611; H04N 23/66; H04N 23/663; H04N 23/70–76; G06T 5/009
See application file for complete search history.

(56) References Cited

U.S. PATENT DOCUMENTS

2018/0089811 A1* 3/2018 Shin ................. G03B 27/80
2022/0078325 A1* 3/2022 Maruyama ........... H04N 5/2353

FOREIGN PATENT DOCUMENTS

| CN | 101262567 A | * | 9/2008 |
| JP | 2007102284 A | | 4/2007 |
| JP | 2016005244 A | * | 1/2016 |
| JP | 2019106741 A | * | 6/2019 |

* cited by examiner

*Primary Examiner* — Paul M Berardesca
(74) *Attorney, Agent, or Firm* — Canon U.S.A., Inc. IP Division

(57) ABSTRACT

An image capturing control apparatus includes a detection unit configured to detect a specific object area in an image captured by an image capturing apparatus, an acquisition unit configured to acquire a first input/output characteristic of the image capturing apparatus, a conversion unit configured to convert the image by acquiring a second input/output characteristic that is an inverse input/output characteristic to the first input/output characteristic, and by applying the second input/output characteristic to the image, and a control unit configured to control exposure of the image capturing apparatus based on a luminance value of the specific object area in the converted image.

17 Claims, 13 Drawing Sheets

CONTROLLING EXPOSURE BASED ON INVERSE GAMMA CHARACTERISTIC

BACKGROUND OF THE DISCLOSURE

Field of the Disclosure

The present disclosure relates to a technique controlling an image capturing apparatus.

Description of the Related Art

Among image capturing devices, some monitoring cameras, digital cameras, and camcorders employ a recent-proposed technique of automatically detecting a specific area of an object on a captured image to optimize image capturing settings such as exposure and image quality based on the information about the detected area. Japanese Patent Application Laid-Open No. 2007-102284 discusses a technique of using preset gamma information in inverse gamma processing on captured image with no gamma information acquired.

The technique discussed in Japanese Patent Application Load-Open No. 2007-102284, however, cannot perform appropriate exposure control with the preset gamma information unadaptable.

SUMMARY OF THE DISCLOSURE

According to an aspect of the present disclosure, an image capturing control apparatus includes a detection unit configured to detect a specific object area in an image captured by an image capturing apparatus, an acquisition unit configured to acquire a first input/output characteristic of the image capturing apparatus, a conversion unit configured to convert the image by acquiring a second input/output characteristic that is an inverse input/output characteristic to the first input/output characteristic, and by applying the second input/output characteristic to the image, and a control unit configured to control exposure of the image capturing apparatus based on a luminance value of the specific object area in the converted image.

Further features of the present disclosure will become apparent from the following description of exemplary embodiments with reference to the attached drawings.

DESCRIPTION OF THE EMBODIMENTS

Some exemplary embodiments of the present disclosure will be described below with reference to drawings. The configurations described in the following exemplary embodiments are merely illustrative, and the present disclosure is not limited to the configurations illustrated and described. Like numbers refers to like elements in the following exemplary embodiments.

Figure 1:
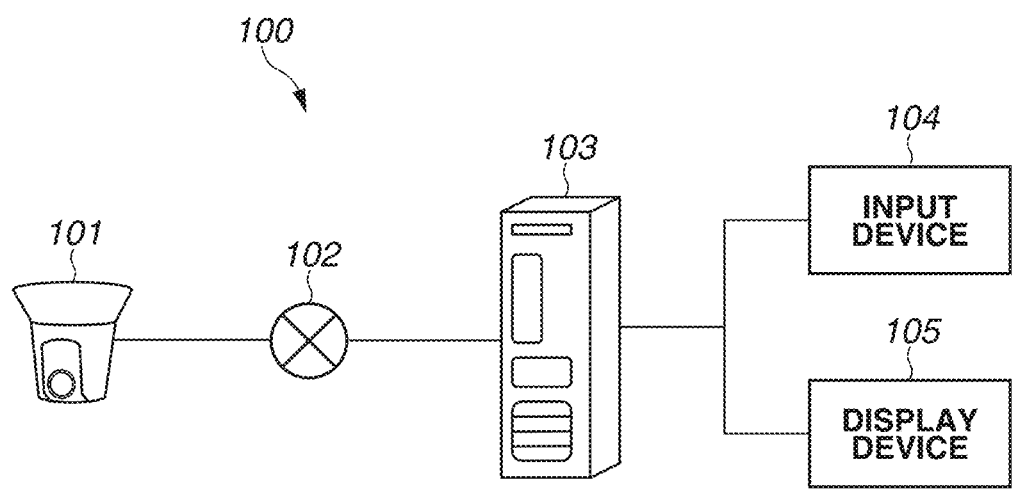
FIG. 1 is a block diagram illustrating a configuration example of an image capturing control system according to a first exemplary embodiment.

FIG. 1 is a block diagram illustrating a configuration example of an image capturing control system 100 according to a first exemplary embodiment. The image capturing control system 100 includes a monitoring camera 101, a network 102, a client apparatus 103, an input device 104, and a display device 105. The monitoring camera 101 is an image capturing apparatus to acquire moving images, and to capture images of objects to perform image processing on them. The monitoring camera 101 and the client apparatus 103 are connected through the network 102, communicable with each other. The client apparatus 103 is communicably connected to the input device 104 and the display device 105. The client apparatus 103 may also be referred to as an information processing apparatus as an apparatus processing various information and also referred to as an image capturing control apparatus as an apparatus controlling image capturing of the monitoring camera 101.

The input device 104 includes a mouse and a keyboard, and is operated by a user of the client apparatus 103.

The display device 105 is a device including a monitor that displays images received from the client apparatus 103. The display device 105 can function as a user interface (UI) such as a touch panel, which means that it can function as an input device to input instructions, information, data, etc. to the client apparatus 103.

FIG. 1 illustrates the client apparatus 103, the input device 104, and the display device 105, each as an independent device; however, the present exemplary embodiment is not limited to such a configuration. For example, the client apparatus 103 and the display device 105 or the input device 104 and the display device 105 may be integrated. Alternatively, the client apparatus 103, the input device 104, and the display device 105 may be integrated. An apparatus composed of the client apparatus 103 integrated with the display device 105 may be a personal computer, a tablet terminal, or a smartphone.

Figure 2:
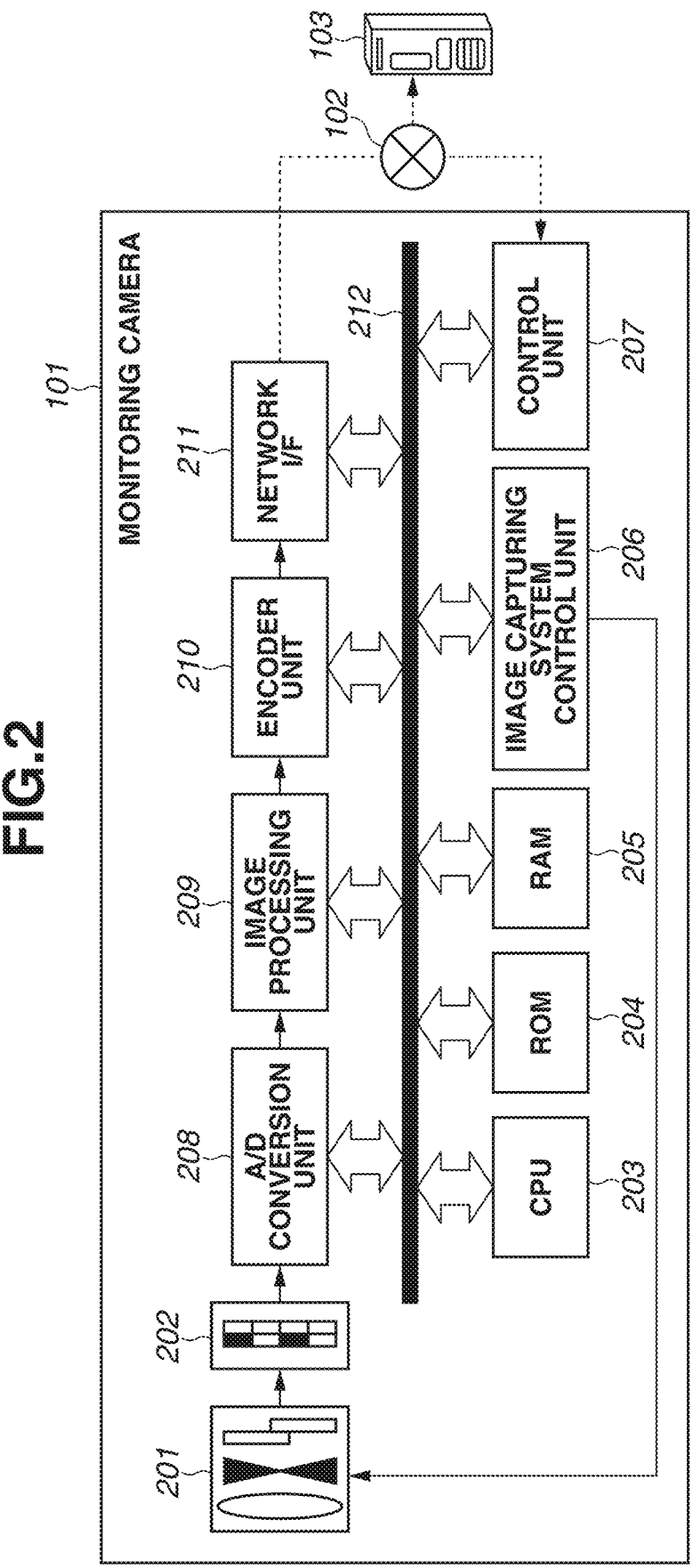
FIG. 2 is a diagram illustrating an internal configuration example of a monitoring camera.

FIG. 2 is a block diagram illustrating an internal configuration example of the monitoring camera 101. The monitoring camera 101 includes an image capturing optical system 201 and an image capturing device 202 as components to capture images. The monitoring camera 101 further includes a camera central processing unit (CPU) 203, a read only memory (ROM) 204, a random access memory (RAM) 205, an image capturing system control unit 206, a control unit 207, an analog/digital (A/D) conversion unit 208, an image processing unit 209, an encoder unit 210, and a network interface (I/F) 211. The units 203 to 211 of the monitoring camera 101 are connected to one another through a system bus 212.

The image capturing optical system 201 is an optical member group including a zoom lens, a focus lens, a camera shake correction lens, a diaphragm, and a shutter, and collects light from an object. The optical image of an object collected by the image capturing optical system 201 is formed on the image capturing plane of the image capturing device 202.

The image capturing device 202 is a charge-accumulation solid-state image capturing device converting the optical image collected by the image capturing optical system 201 into electric current values (signal values), such as a complementary metal-oxide semiconductor (CMOS) and a charge coupled device (CCD), and serves as an image capturing unit acquiring color information with color filters combined therewith. The image capturing device 202 is connected to the A/D conversion unit 208.

The A/D conversion unit 208 convers the quantities of light from the object detected by the image capturing device 202 into digital signals (image data). The A/D conversion unit 208 transmits the digital signals to the image processing unit 209.

The image processing unit 209 performs image processing on the image data of the digital signals received from the image capturing device 202. The image processing unit 209 is connected to the encoder unit 210.

The encoder unit 210 performs processing to convert the image data processed by the image processing unit 209 into image data in a file format such as motion Joint Photographic Experts Group (JPEG), H264, and H265. The encoder unit 210 is connected to the network O/F 211.

The camera CPU 203 is a control unit performing the general control operations of the monitoring camera 101. The camera CPU 203 reads instructions stored in the ROM 204 and the RAM 205, and performs processing based on the read instructions.

The image capturing system control unit 206 controls each of the units of the monitoring camera 101 based on instructions from the camera CPU 203. For example, the image capturing system control unit 206 performs control processing on the image capturing optical system 201 such as focus control, shutter control, and aperture adjustment.

The network I/F 211 is an interface used in communication with external apparatuses such as the client apparatus 103 through the network 102, and is controlled by the control unit 207.

The control unit 207 controls communications with the client apparatus 103, and performs control processing to relay control commands (control signals) issued by the client apparatus 103 to the units of the monitoring camera 101, to the camera CPU 203.

The network 102 is an internet protocol (IP) network connecting the monitoring camera 101 and the client apparatus 103. The network 102 includes plural routers, switches, and cables conforming to communication standards such as Ethernet®. In the present exemplary embodiment, the communication standard, the scale, the configuration, etc. of the network 102 are not limited as long as the network 102 enables communication between the monitoring camera 101 and the client apparatus 103. For example, the network 102 may be the Internet, a wired local area network (LAN), a wireless LAN, or a wide area network (WAN).

Figure 3:
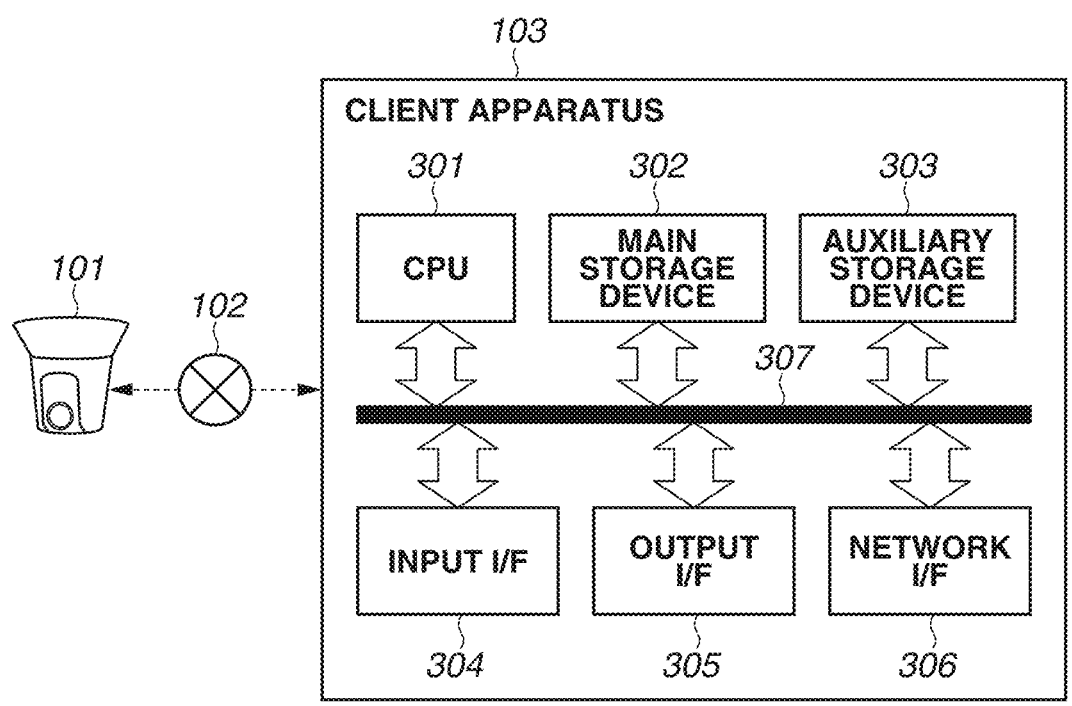
FIG. 3 is a diagram illustrating an internal configuration example of a client apparatus.

FIG. 3 is a block diagram illustrating an internal configuration example of the client apparatus 103. The client apparatus 103 includes a client CPU 301, a main storage device 302, an auxiliary storage device 303, an input I/F 304, an output IF 305, and a network I/F 306. The elements of the client apparatus 103 are connected communicable with one another through a system bus 307.

The client CPU 301 is a central processing unit performing the general control processing on the client apparatus 103. In one or more embodiments, the client CPU 301 performs the general control processing on the monitoring camera 101 through the network 102.

The main storage device 302 is a storage device such as a RAM, functioning as a temporal data storage of the client CPU 301.

Figure 4:
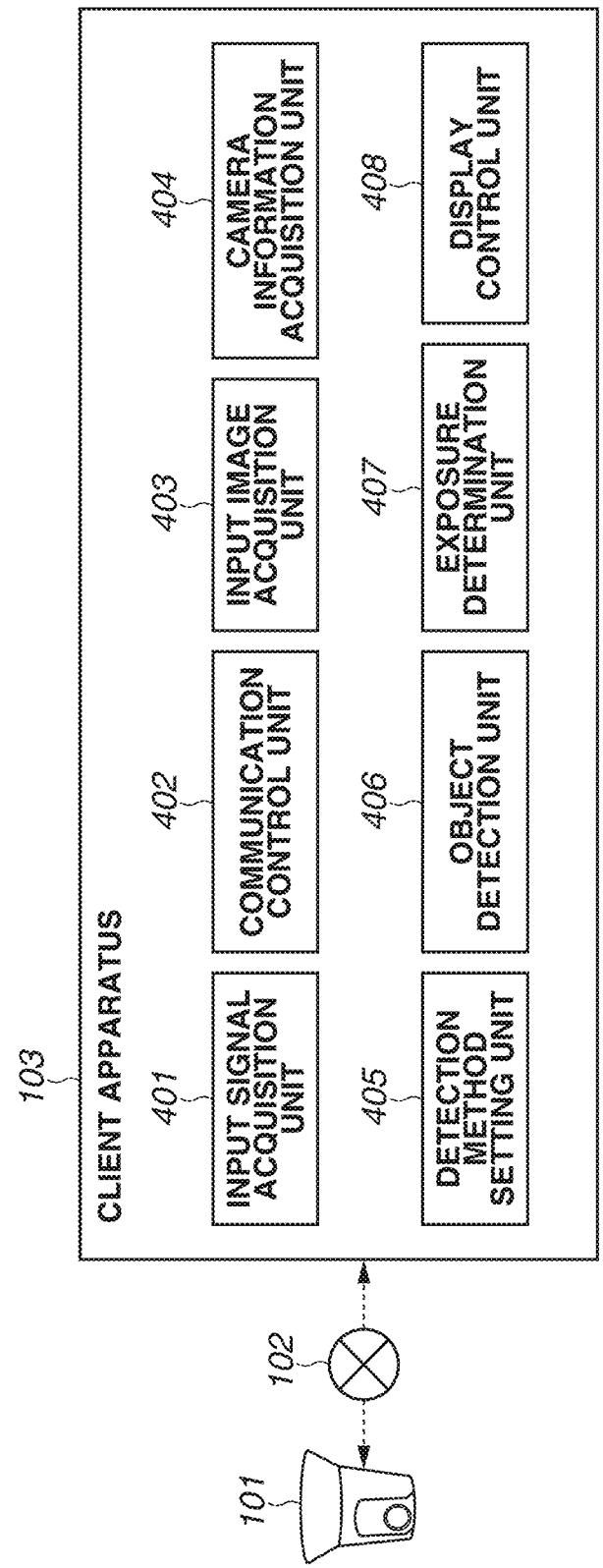
FIG. 4 is a diagram illustrating a functional configuration example of the client apparatus.

The auxiliary storage device 303 is a storage device, such as a hard disk drive (HDD), a ROM, or a solid state drive (SSD), storing various kinds of programs, various kinds of setting data, etc. The programs according to the present exemplary embodiment are stored in the auxiliary storage device 303. In the present exemplary embodiment, the functionality and processing of the client apparatus 103 illustrated in FIG. 4 are achieved by processing carried out based on the programs loaded on the main storage device 302 after being read out from the auxiliary storage device 303. The detail thereof will be described below. Further, for example, the auxiliary storage device 303 stores patterns for pattern matching (patterns corresponding to feature portions on faces and human bodies) used in face or human body detection based on image data by the client apparatus 103. In one or more embodiments, the patterns for pattern matching created through program runs are stored in the main storage device 302.

The input I/F 304 is an interface used when the client apparatus 103 receives inputs (signals) from the input device 104 or other devices.

The output I/F 305 is an interface used when the client apparatus 103 outputs information (signals) to the display device 105 or other devices.

The network I/F 306 is an interface used in communication with an external apparatus such as the monitoring camera 101 through the network 102.

FIG. 4 is a functional block diagram illustrating functions performed by the client apparatus 103. In other words, functional units (functional blocks) illustrated in FIG. 4 are performable by the client CPU 301, and the functional units are synonymous with the client CPU 301.

As illustrated in FIG. 4, the client CPU 301 of the client apparatus 103 includes some functional units: an input signal acquisition unit 401, a communication control unit 402, an input image acquisition unit 403, a camera information acquisition unit 404, and a detection method setting unit 405. The client CPU 301 further includes other functional units: an object detection unit 406, an exposure determination unit 407, and a display control unit 408. In one or more embodiments, the client apparatus 103 includes other hardware (or software) including the functional units 401 to 408 illustrated in FIG. 4, instead of the client CPU 301.

The input signal acquisition unit 401 receives inputs from a user through the input device 104.

The communication control unit 402 performs control processing to receive images transmitted from the monitoring camera 101 (images captured by monitoring camera 101) through the network 102. Further, the communication control unit 402 performs control processing to transmit control commands issued by the client apparatus 103 to the monitoring camera 101 through the network 102.

The input image acquisition unit 403 acquires images received from the monitoring camera 101 through the communication control unit 402, as input images of targets in object detection processing (images to which object detection processing is to be applied). The detail of the detection processing will be described below.

The camera information acquisition unit 404 acquires camera information when the monitoring camera 101 captures images of objects through the communication control unit 402. The camera information includes various types of camera setting information and image processing information when the monitoring camera 101 captures and acquires images of objects. More specifically, the camera information includes exposure parameters (camera setting information about exposure) such as a diaphragm stop, a shutter speed, and a gain, and information about image processing relating to luminance, such as gamma correction, edge enhancement, and white balance.

Further, in the present exemplary embodiment, the input image acquisition unit 403 or the camera information acquisition unit 404 also performs determination processing to determine whether the input/output characteristic of the monitoring camera 101 to the images are valid. The detail of the input/output characteristic determination processing will be described below.

The detection method setting unit 405 sets a predetermined (appropriate) detection method among various detection methods including face area detection (face detection) and human body area detection (human body detection) on the input images acquired by the input image acquisition unit 403. In the present exemplary embodiment, the detection method setting unit 405 sets (selects) a face detection method or a human body detection method.

The object detection unit 406 detects a specific object area within an input image captured by the monitoring camera 101 and acquired by the input image acquisition unit 403. For example, with face detection set in the detection method setting unit 405, the object detection unit 406 gives precedence to detecting a face area in the input image. On the other hand, with human body detection set in the detection method setting unit 405, the object detection unit 406 gives precedence to detecting a human body area in the input image.

However, the present exemplary embodiment is not limited to such settings. A detection method of detecting a partial feature area on a person, for example, the upper half body, the head, or an organ such as the eyes, the nose, and the mouth may be set (selected). Further, in the present exemplary embodiment, specific objects to detect are persons; however, a configuration may be employed that can detect feature areas of specific objects other than persons. Examples include a configuration that can detect specific objects preset in the client apparatus 103, such as faces of animals and automobiles.

The exposure determination unit 407 performs conversion processing to convert a predetermined input/output characteristic for an input image, and determination processing to determine an exposure control value based on a luminance value of a specific object area of the image having the converted input/output characteristic. The exposure determination unit 407 then performs exposure control processing on the monitoring camera 101 through the communication control unit 402, based on the determined exposure control value. More specifically, the exposure determination unit 407 determines an exposure level based on image information on the object area acquired from the object detection unit 406, and transmits the exposure control value (exposure correction value) corresponding to the exposure level to the communication control unit 402. The communication control unit 402 transmits a control command corresponding to the exposure control value (exposure correction value) to the monitoring camera 101 through the network I/F 306. In the monitoring camera 101 having received the control command, the control unit 207 and the image capturing system control unit 206 perform exposure control processing in response to the control command. Further, in the present exemplary embodiment, the exposure determination unit 407 changes a method of controlling the exposure of the monitoring camera 101 based on the result of the determination whether the input/output characteristic is valid. The detail of the processing by the exposure determination unit 407 will be described below with reference to a flowchart in FIG. 5 or the like.

The display control unit 408 outputs the captured image in which exposure correction with the exposure correction value determined by the exposure determination unit 407 is reflected, to the display device 105 in response to an instruction from the client CPU 301.

Figure 5:
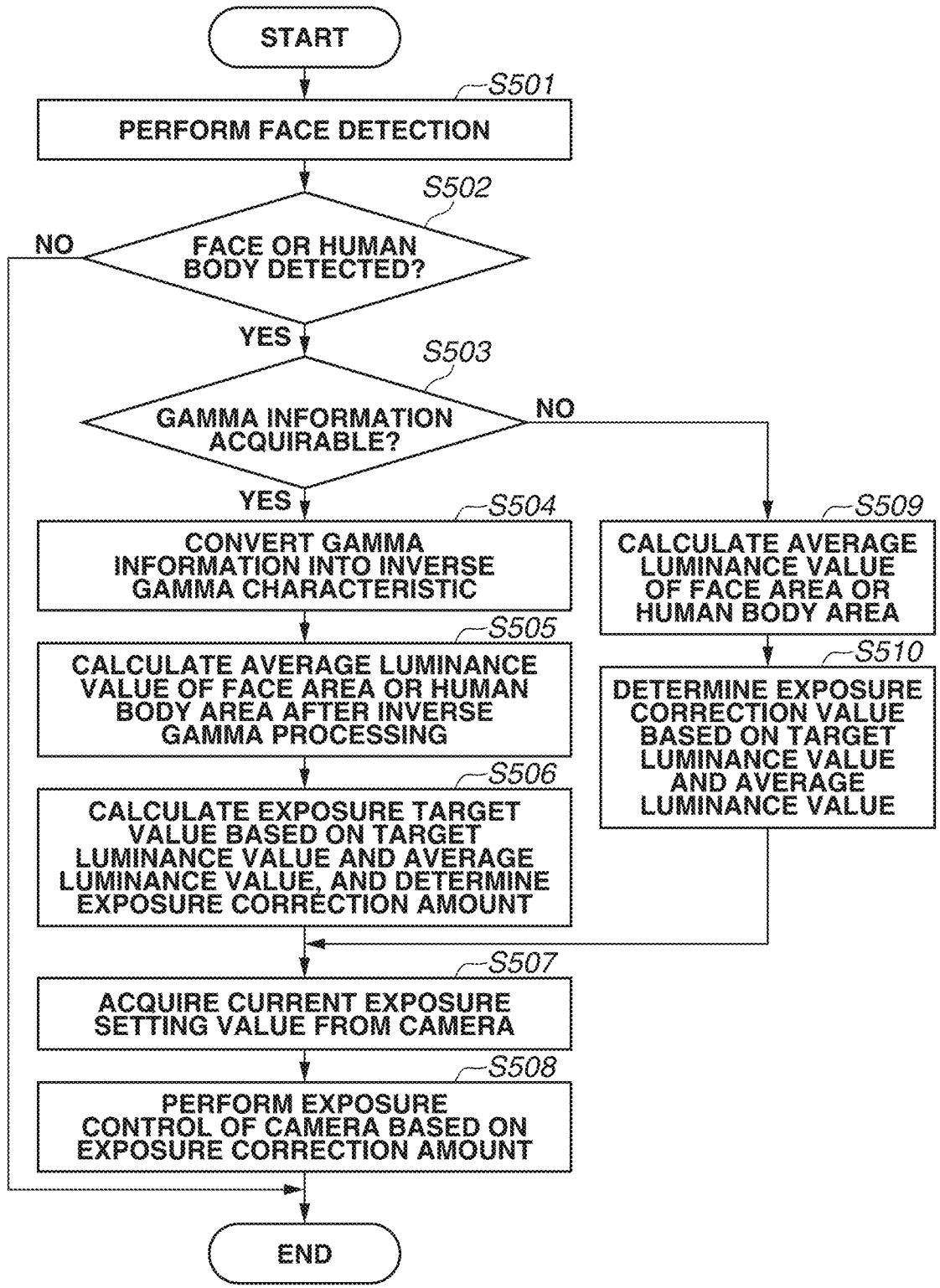
FIG. 5 is a flowchart of exposure control processing according to the first exemplary embodiment.

FIG. 5 is a flowchart illustrating a procedure of object detection processing and exposure control processing according to the present exemplary embodiment. The flowchart in FIG. 5 illustrates a procedure of the detailed processing relating to the input image acquisition unit 403, the camera information acquisition unit 404, the detection method setting unit 405, the object detection unit 406, and the exposure determination unit 407. It is assumed that, in the image capturing control system 100 in FIG. 1, the monitoring camera 101, the client apparatus 103, the input device 104, and the display device 105 have been turned on, and that the connection (communication) between the monitoring camera 101 and the client apparatus 103 has been established. Further, it is assumed that, in this state, a process of capturing an image of an object, transmitting the image data from the monitoring camera 101 to the client apparatus 103, and displaying the image on the display device 105 is repeated at predetermined regular update intervals by the monitoring camera 101. Further, it is assumed that the processing of the flowchart in FIG. 5 is started by the client CPU 301 in response to input of a captured image of an object, etc. from the monitoring camera 101 to the client apparatus 103 through the network 102.

First, in step S501, the detection method setting unit 405 sets a method of detecting faces or human bodies, to the object detection unit 406. The object detection unit 406 performs face or human body detection processing on the input image based on the setting by the detection method setting unit 405. The auxiliary storage device 303 of the client apparatus 103 previously stores patterns corresponding to feature portions of faces and human bodies, and the object detection unit 406 detects face areas or human body areas through pattern matching based on the patterns.

Next, in step S502, the object detection unit 406 determines whether a face or human body area has been detected in the image by the face or human body detection processing performed in step S501. If at least one face or human body area has been detected (YES in step S502), the processing of the client CPU 301 proceeds to step S503. If no face or human body area is detected (NO in step S502), the processing ends.

Figure 6A:
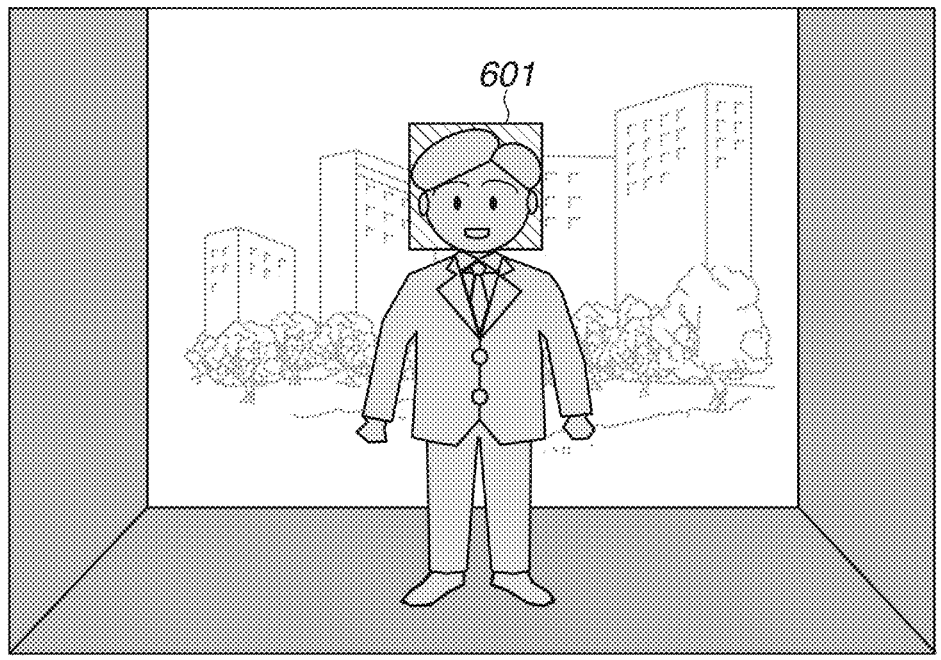
FIGS. 6A and 6B are diagrams illustrating detection examples of a face area and a human body area.
Figure 6B:
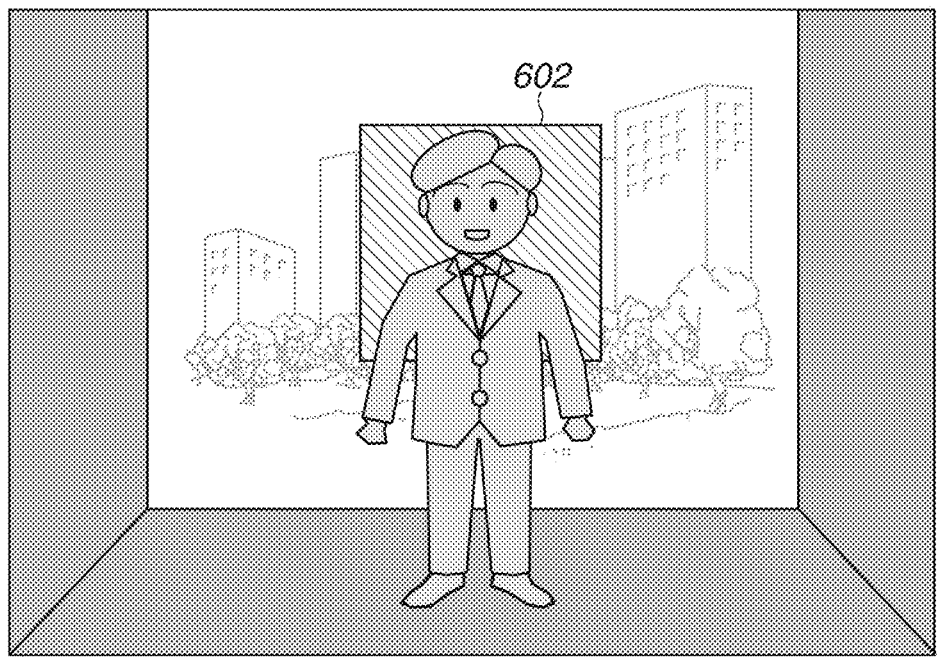

Face area detection typically enables detection of faces with high accuracy distinguishing the face areas from the other areas of the object. However, the face area may fail to be detected correctly under the conditions of orientation, size, brightness, and other features of faces not suitable for face detection. On the other hand, human body detection enables the detection of an area where a person is present irrespective of orientation, size, brightness, and other features of faces. In the human body detection in the present exemplary embodiment, any detection of the upper half body, the bust and face, or the head area including the face is applicable other than a detection of the whole body. FIG. 6A is a diagram illustrating an example of a face area 601 detected on the image, and FIG. 6B is a diagram illustrating an example of a human body area 602 detected on the image.

A pattern matching method employed as the object detection method can use patterns (classifiers) created through statistical learning. Alternatively, the object detection may be performed by a method other than the pattern matching, for example, by using luminance gradient within a local area of the image. In other words, the object detection method is not limited to a particular detection method, and various methods such as a detection method based on machine learning or distance information are employable.

In step S503, the input image acquisition unit 403 or the camera information acquisition unit 404 performs determination processing to determine whether the predetermined input/output characteristic of the input image is valid. In the present exemplary embodiment, the input image acquisition unit 403 or the camera information acquisition unit 404 determines whether predetermined gamma information about the input image is acquirable, as the input/output characteristic determination processing. If the predetermined gamma information is acquirable, the input image acquisition unit 403 or the camera information acquisition unit 404 acquires the input/output characteristic (gamma information) of the monitoring camera 101.

The gamma information as metadata held of the input image may be acquired, or may be acquired from the monitoring camera 101 separately from the input image. Even if the gamma information is not acquirable, gamma information may be acquired from among a plurality of previously stored pieces of gamma information about different patterns corresponding to the types of connectable monitoring camera 101. The pieces of gamma information about different patterns may be stored in, for example, the auxiliary storage device 303, or a plurality of pieces of gamma information created through program runs may be stored in the main storage device 302. For example, with the pieces of gamma information about different patterns previously stored, the camera information acquisition unit 404 performs identification information acquisition processing to acquire the identification (ID), the serial number, the individual identification number, and other pieces of identification information identifying the monitoring camera 101. Further, the camera information acquisition unit 404 selects adaptive gamma information from among the previously stored pieces of gamma information based on at least one of the pieces of identification information.

Figure 7:
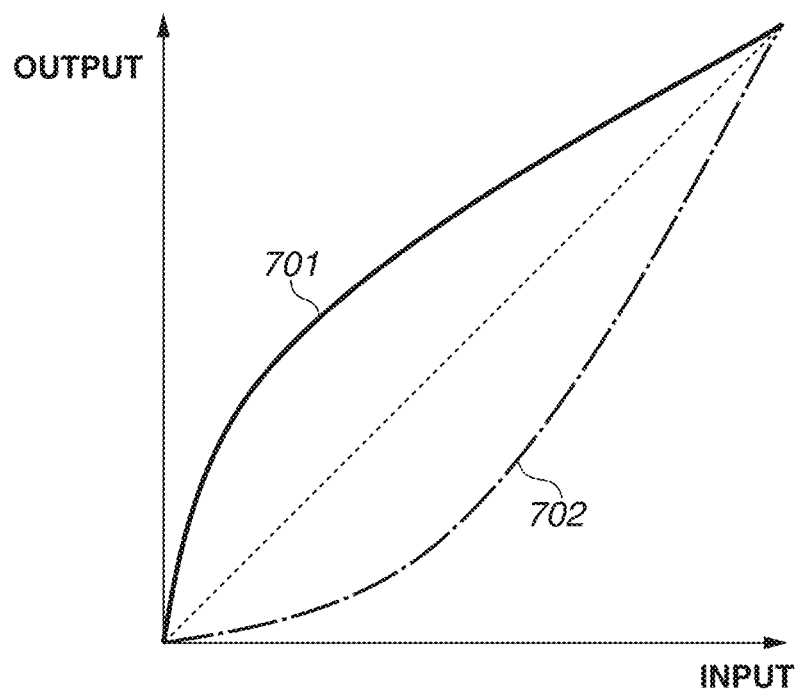
FIG. 7 is a diagram illustrating characteristics of gamma processing and inverse gamma processing according to the first exemplary embodiment.

A solid line 701 in FIG. 7 illustrates an example of the graphed relationship between input values and output values of the gamma characteristic corresponding to the gamma information. If the gamma information about the input image has not been acquired, namely, if the gamma characteristic is unknown (NO in step S503), the processing of the client CPU 301 proceeds to step S509. Otherwise (YES in step S503), the processing proceeds to step S504.

In step S504, the exposure determination unit 407 performs processing to convert the predetermined input/output characteristic on the input image. In the present exemplary embodiment, the exposure determination unit 407 performs input/output characteristic conversion processing such as the inverse gamma processing corresponding to the gamma information acquired in step S503. In other words, the exposure determination unit 407 acquires or calculates the input/output characteristic (inverse gamma characteristic) corresponding to the input/output characteristic (gamma information) acquired by the camera information acquisition unit 404, and applies the inverse gamma characteristic to the input image to convert the image. At this time, the inverse gamma characteristic may be generated as a table or a gamma value. The relationship between input values and output values where the gamma value is denoted by γ is expressed by the following expression (1).

$$I'(x, y) = I_{max}\left(\frac{I(x, y)}{I_{max}}\right)^{\gamma} \quad (1)$$

In the expression, I(x, y) is a luminance value at the two-dimensional coordinate position (x, y) in the horizontal direction (x-axis direction) and in the vertical direction (y-axis direction) in the image. Further, $I_{max}$ is the maximum value of luminance.

An alternate long and short dash line 702 in FIG. 7 illustrates the graphed relationship between input values and output values of the inverse gamma characteristic corresponding to the gamma characteristic indicated by the solid line 701.

Next, in step S505, the exposure determination unit 407 calculates the average luminance value of the face areas or the human body areas (hereinafter, referred to as attention areas) detected in step S501. More specifically, the exposure determination unit 407 applies information about the number of attention areas detected in step S501, the position of each of the attention areas, and the size of each of the attention areas, to the following expression (2).

$$\bar{I}_{object} = \frac{1}{f}\sum_{s=1}^{f}\left\{\frac{1}{k_s \times l_s}\sum_{i=-k_s/2}^{k_s/2}\sum_{j=-l_s/2}^{l_s/2} I'(v_s + i, h_s + j)\right\} \quad (2)$$

In the expression, f is the number of attention areas, (v, h) is the center coordinate of each of the attention areas, k is the size of each of the attention areas in the horizontal direction, and l is the detected size of each of the attention areas in the vertical direction.

Next, in step S506, the exposure determination unit 407 determines the amount of exposure correction $EV_{correction}$ based on the average luminance value calculated in step S505. The exposure determination unit 407 first calculates the amount $EV_{add}$ of the exposure value to be added by using the average luminance value $I_{object}$ of the attention areas calculated in step S505 and the target luminance value $I_{object\ target}$ of each of the attention areas, by the following expression (3). The target luminance value $I_{object\ target}$ is a target luminance value after the inverse gamma processing. With a camera connected to a system for face authentication or another purpose, the images input to the system are the images that have undergone gamma processing. Thus, the target luminance value after the gamma processing is first determined and the inverse gamma processing is applied to the target luminance value after the gamma processing, thereby setting the target luminance value $I_{object\ target}$. The target luminance value may be optionally set by the user, or may be set to a value that will lead to high accuracy by collating with the authentication accuracy in the face authentication.

$$EV_{add} = \log_2\left(\frac{I_{object\ target}}{I_{object}}\right) \quad (3)$$

Next, the exposure determination unit 407 determines the amount of exposure correction $EV_{correction}$ by an expression (4).

$$EV_{correction} = EV_{current} + \alpha EV_{add} \quad 0 \leq \alpha \leq 1 \quad (4)$$

In the expression, $EV_{current}$ is a current exposure value. Further, a parameter α is a coefficient affecting the correction degree (speed) of the current exposure value $EV_{current}$. With a greater value of the parameter α set, processing speed (or time) until the exposure value reaches the target value is fast; however, an erroneous determination as the detection result or unstable detection of an object results in dramatically varying brightness of the entire screen. In contrast, with a smaller value of the parameter α set, the processing speed (or time) until the exposure value reaches the target value is slow; however, the effects of an erroneous detection and an image capturing condition are reduced.

Next, in step S507, the camera information acquisition unit 404 acquires information on the current exposure setting value from the monitoring camera 101. In the present exemplary embodiment, the current exposure correction value of the monitoring camera 101 is acquired.

Next, in step S508, the exposure determination unit 407 communicates with the monitoring camera 101 through the communication control unit 402, and sets, as an exposure control value, the exposure correction value corresponding to the amount of exposure correction calculated in step S506 to the monitoring camera 101. Thereafter, the processing in the flowchart ends.

In contrast, in step S509, to which the processing proceeds as the gamma information is unknown due to no acquisition of the gamma information in step S503, the exposure determination unit 407 calculates the average luminance value of the attention areas detected in step S501 without performing the inverse gamma processing. More specifically, the exposure determination unit 407 applies the information about the number of attention areas detected in step S501, the position of each of the attention areas, and the size of each of the attention areas, to the following expression (5). In the expression (5), the redundant descriptions of the elements same as those in the expression (2) will be omitted.

$$I_{object} = \frac{1}{f}\sum_{s=1}^{f}\left\{\frac{1}{k_s \times l_s}\sum_{i=-k_s/2}^{k_s/2}\sum_{j=-l_s/2}^{l_s/2} I(v_s + i, h_s + j)\right\} \quad (5)$$

Next, in step S510, the exposure determination unit 407 calculates the difference value between the average luminance value $I_{object}$ of the attention areas calculated in step S509 and the target luminance value $I_{object\ target}$ of each of the attention areas, by the following expression (6). For example, the target luminance value $I_{object\ target}$ of each of the attention areas may be optionally set by the user, or may be set to a value that will lead to high accuracy by collating with the authentication accuracy in the face authentication.

$$\Delta Diff = I_{object\ target} - I_{object} \quad (6)$$

Next, the exposure determination unit 407 determines the amount of exposure correction $EV_{correction}$ by an expression (7).

$$EV_{correction} = \begin{cases} EV_{current} - \beta & \text{if } \Delta Diff < -Th \\ EV_{current} & \text{if } Th \leq \Delta Diff \leq Th \\ EV_{current} + \beta & \text{if } Th < \Delta Diff \end{cases} \quad (7)$$

In the expression, a parameter β is a coefficient affecting the correction degree (speed) when the exposure is corrected to an underexposure level or an overexposure level. A greater value of the parameter β set makes the processing speed (or time) until the exposure value reaches the target value fast; however, an erroneous determination as the detection result or unstable detection of an object results in dramatically varying brightness of the entire screen. In contrast, a smaller value of the parameter β set makes the processing speed (or time) until the exposure value reaches the target value slow; however, the effects of an erroneous detection and an image capturing condition are reduced. The parameter β is set to an exposure correction value in an overexposure range with the difference ΔDiff over a set threshold Th. In contrast, with the difference ΔDiff less than a set threshold −Th, the parameter β is set to an exposure correction value in an underexposure range. This processing is repeated to control the brightness of the object area to be close to the target luminance value $I_{object\ target}$.

Figure 8:
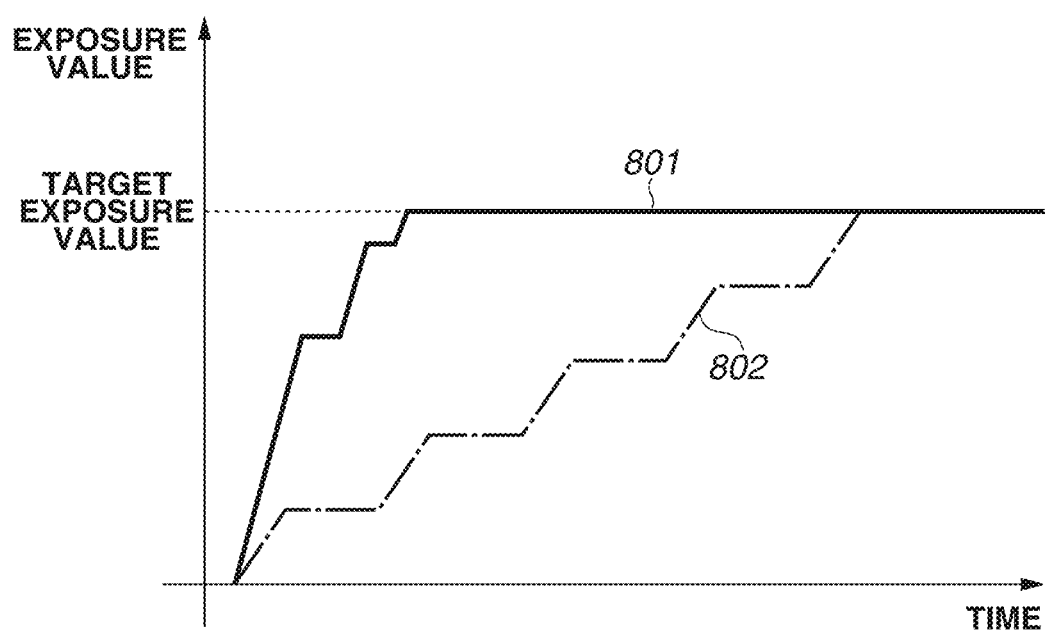
FIG. 8 is a diagram illustrating change of exposure values by each of two exposure control methods.

The exposure control method for unknown gamma information due to no acquisition of gamma information d may relatively delay the time of starting the exposure control. This is to prevent the exposure control from being too sensitive to disturbance such as rapid luminance variation. FIG. 8 is a graph illustrating an example of change in exposure value with the lapse of time until the exposure value reaches the target exposure value depending on the different exposure control method described above, namely, an example in which the exposure control method is changed in the present exemplary embodiment. A solid line 801 in FIG. 8 indicates change in exposure value with the acquired gamma information, and an alternate long and short dash line 802 indicates change in exposure value with no gamma information acquired.

As described above, the client apparatus 103 according to the first exemplary embodiment changes the exposure control method based on the luminance value of the face area or the human body area, depending on the gamma information acquisition result, namely, the result of the determination whether the input/output characteristic is valid. This enables appropriate exposure control based on the type of the monitoring camera communicating with the client apparatus 103. In other words, the client apparatus 103 can perform appropriate exposure control irrespective of whether the gamma information of the connected monitoring camera is acquirable. According to the first exemplary embodiment, the face of an object (person) such as a customer and a visitor can therefore be stably captured.

A second exemplary embodiment will be described with reference to FIG. 7 and FIG. 9 to FIG. 13. In the second exemplary embodiment, a method will be described of generating the gamma information with the gamma characteristic unknown due to no acquisition of the gamma information about the camera. Like numbers refer to like elements and like processing steps as with the first exemplary embodiment, and the redundant descriptions of those elements and the processing steps will be omitted.

Figure 9:
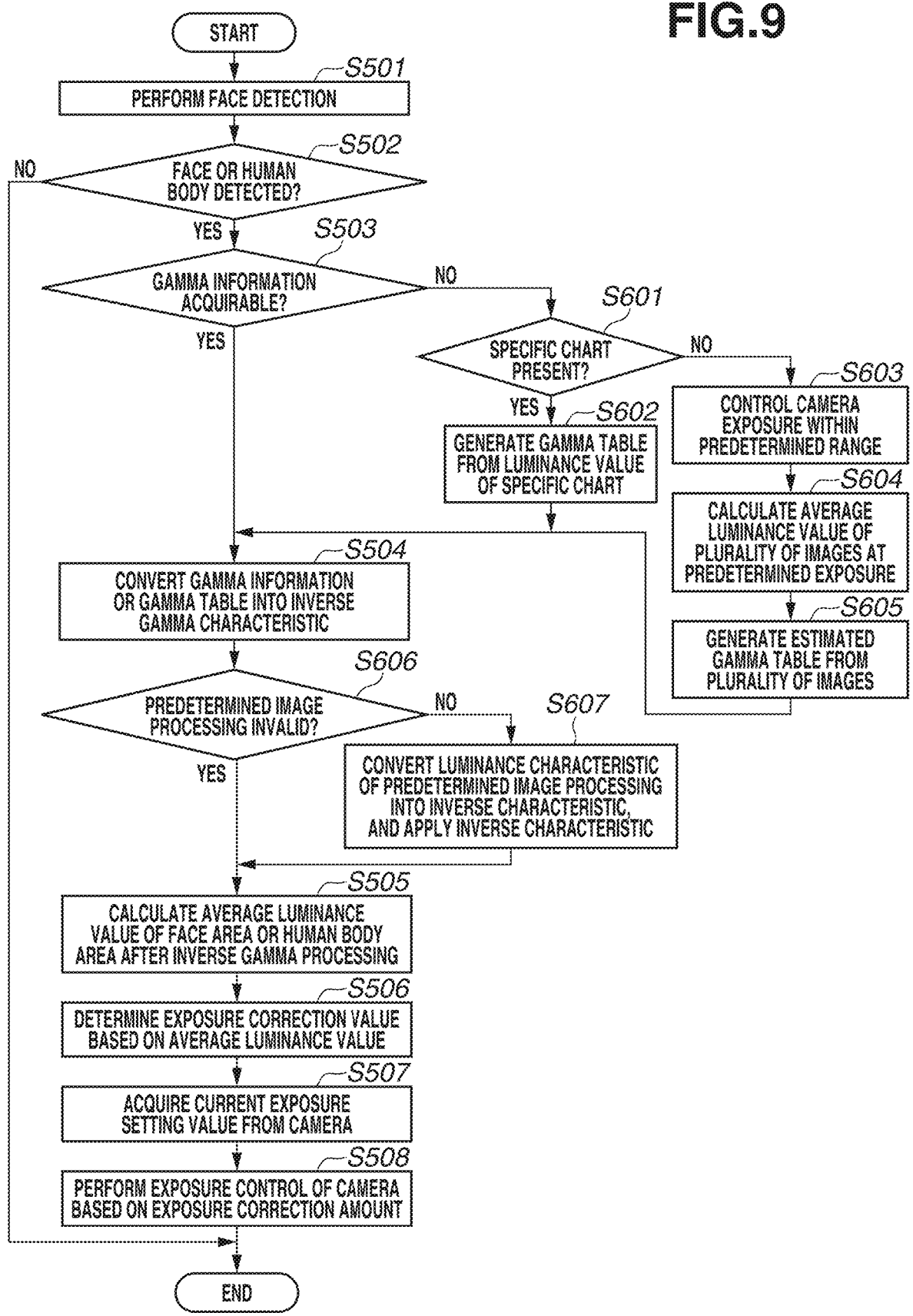
FIG. 9 is a flowchart of exposure control processing according to a second exemplary embodiment.

FIG. 9 is a flowchart illustrating object detection processing and exposure control processing performed by the client CPU 301 of the client apparatus 103 according to the second exemplary embodiment. The description of the processing steps including a start timing and steps S501 to S508 the same as those in the first exemplary embodiment will be omitted.

In the second exemplary embodiment, if the gamma characteristic is unknown due to no acquisition of the gamma information in step S503 (NO in step S503), the processing of the client CPU 301 proceeds to step S601. If the gamma information is acquired (YES in step S503), the processing proceeds to step S504.

In step S601, the object detection unit 406 detects a specific chart from the input image.

Figure 10:
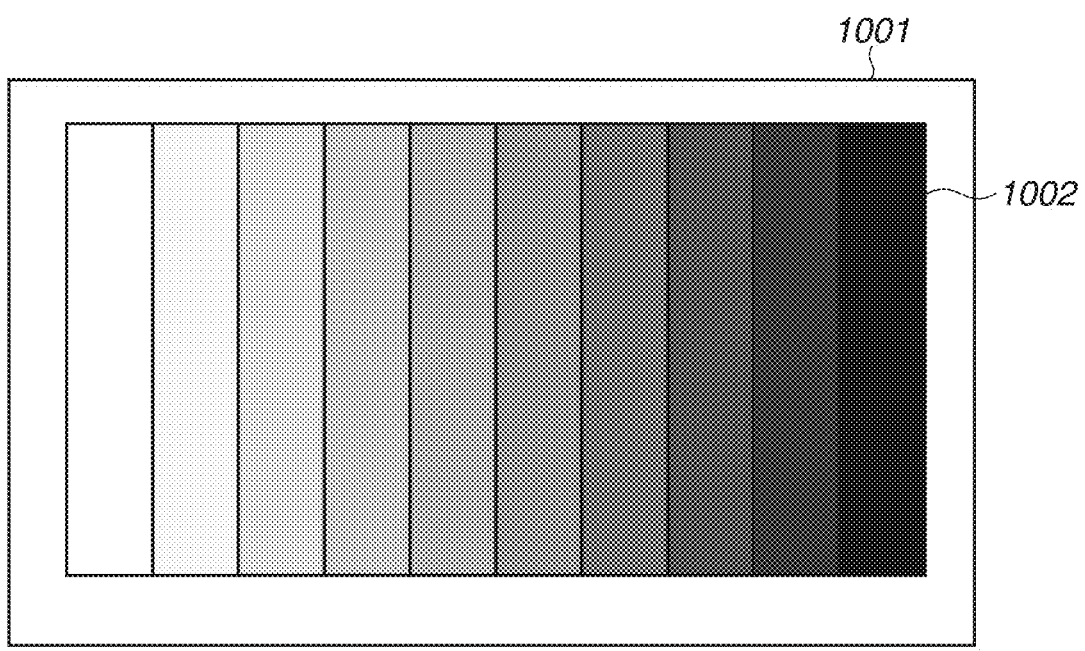
FIG. 10 is a conceptual diagram of a specific chart.

The specific chart here is a reflective chart 1001 as illustrated in FIG. 10, and includes a plurality of patch portions 1002 different in shade (reflectance). The specific chart is previously created in consideration of a predetermined gamma characteristic (e.g., $\gamma=2.2$). If the specific chart has not been detected in step S601 (NO in step S601), the processing of the client CPU 301 proceeds to step S603. Otherwise (YES in step S601), the processing proceeds to step S602.

In step S602, the input image acquisition unit 403 generates a gamma table to be used in next step S504, from the input images including the specific chart. The input image acquisition unit 403 may acquire data about the gamma characteristic of the specific chart, for example, previously stored in the auxiliary storage device 303. Further, the input image acquisition unit 403 may calculate the luminance value of each of the patch portions 1002 on the specific chart of the input image to generate a gamma table based on the luminance values of the respective patch portions 1002. In the present exemplary embodiment, it is assumed that the gamma characteristic and the gamma value identical to the gamma characteristic and the gamma value indicated by the solid line 107 in FIG. 7 are acquired. In this case, in step S504 subsequent to step S602, the inverse gamma characteristic indicated by the alternate long and short dash line 702 are obtained based on the gamma characteristic and the gamma value indicated by the solid line 701 in FIG. 7 described above.

Figure 11:
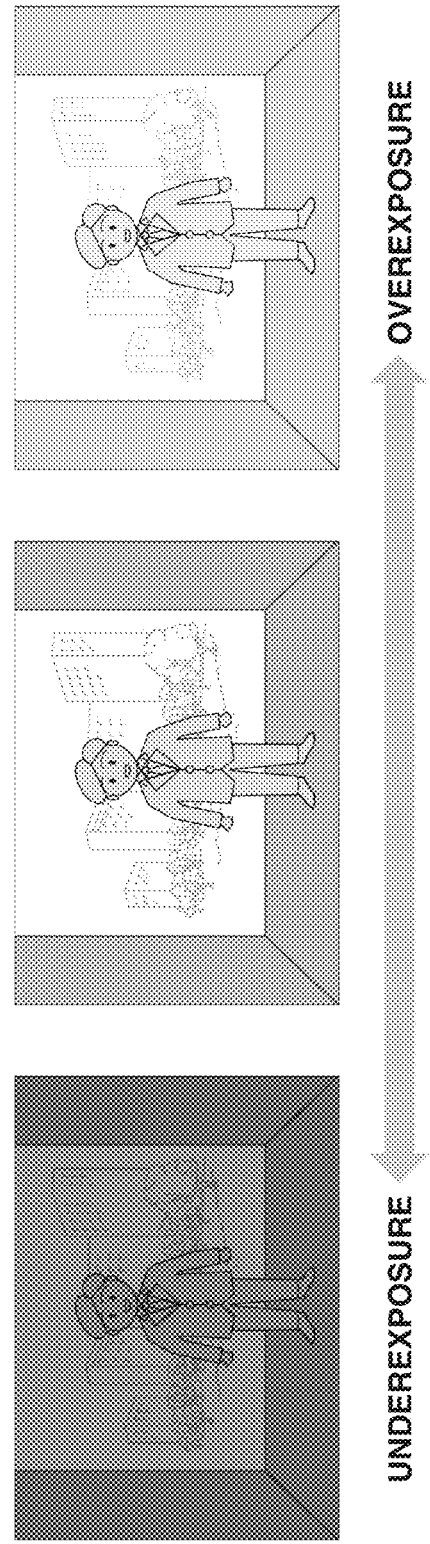
FIG. 11 is a conceptual diagram of an input image with exposure control in a predetermined range.
Figure 12:
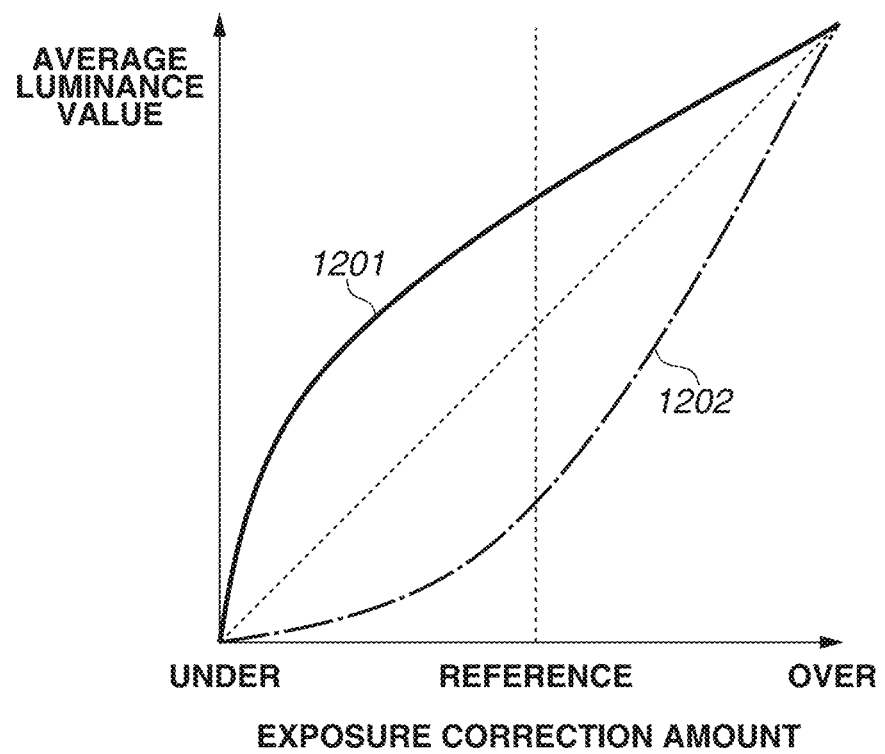
FIG. 12 is a diagram illustrating characteristics of gamma processing and inverse gamma processing according to the second exemplary embodiment.

On the other hand, if no specific chart is detected in step S601 and the processing proceeds to step S603, the exposure determination unit 407 controls the exposure in a possible range from an overexposure level to an underexposure level. The order of control the exposure between an overexposure level and an underexposure level is not limited. If the camera information acquisition unit 404 acquires an exposure control range, the exposure determination unit 407 performs exposure control processing in the acquired exposure control range. FIG. 11 illustrates an example of the images obtained by the exposure being controlled between an overexposure level and an underexposure level.

Next, in step S604, the input image acquisition unit 403 calculates the average luminance value of a plurality of images at each predetermined exposure correction value, obtained in the control of the exposure in step S603. The method of calculating the average luminance value by the above-described expression (5) uses the images in place of the attention areas, and the redundant descriptions of the method will be omitted. A solid line 1201 in FIG. 12 indicates average luminance values with the exposure controlled from a minimum underexposure level to a maximum overexposure level of the average luminance values of the images with reference to the reference exposure value.

Next, in step S605, the input image acquisition unit 403 generates an estimated gamma table or an estimated gamma value based on the average luminance values of the images calculated in step S604. After that, the processing of the client CPU 301 proceeds to step S504. In step S504, the exposure determination unit 407 performs inverse conversion of the estimated gamma table or the estimated gamma value. An alternate long and short dash line 1202 in FIG. 12 indicates the characteristic through the inverse conversion of the luminance characteristic indicated by the solid line 1201.

Next, in step S606, the camera information acquisition unit 404 determines whether any predetermined image processing step relating to the luminance of the image other than the gamma processing is valid. Examples of the predetermined image processing steps include an S-shape tone correction processing step used to reduce fog and mist in an image, as illustrated by a solid line 1301 in FIG. 13. Further, a predetermined image processing step may be image processing with a different luminance conversion characteristic, such as dark part correction and bright part correction of an image. If any image processing step relating to the luminance of the image other than the gamma processing is valid (NO in step S606), the processing of the client CPU 301 proceeds to step S607. Otherwise (YES in step S606), the processing in steps S505 to S508 is performed and the processing ends.

Figure 13:
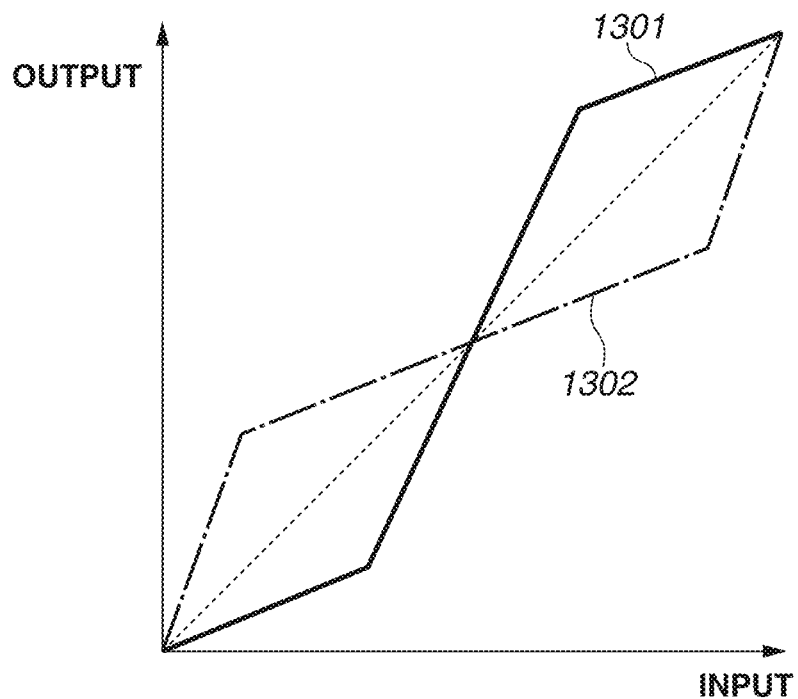
FIG. 13 is a diagram illustrating an example of tone correction processing according to the second exemplary embodiment.

In step S607, to which the processing proceeds due to the determination that any predetermined image processing step is valid, the exposure determination unit 407 converts the luminance conversion characteristic in the predetermined image processing into an inverse characteristic. The characteristic obtained by inversely converting the luminance conversion characteristic indicated by the solid line 1301 in FIG. 13 is indicated by an alternate long and short dash line 1302.

After that, in step S505, the exposure determination unit 407 calculates the average luminance value using the conversion characteristic obtained by multiplying the inverse conversion characteristic and the inverse gamma characteristic in step S607. After that, the processing in steps S506 to step S508 is performed and the processing ends.

In the second exemplary embodiment, even if no gamma information is acquired from the camera, the gamma information can be newly generated by using a different method. Thus, the configuration according to the second exemplary embodiment enables appropriate exposure control processing on the currently connected camera. Further, according to the second exemplary embodiment, even if any image processing step affecting the luminance of the image, such as the fog and mist correction and the dark part correction, other than the gamma processing is valid, appropriate exposure control processing is performable similarly.

The present disclosure can be implemented by supplying programs carrying out one or more functions of the above-described exemplary embodiments to a system or an apparatus through a network or a storage medium, and causing one or more processors of a computer of the system or the apparatus to read out and execute the programs. Further, the present disclosure can be implemented by a circuit (e.g., application specific integrated circuit (ASIC)) carrying out one or more functions.

The above-described exemplary embodiments illustrate mere specific examples for implementation of the present disclosure, and should not be understood that the examples limit the technical scope of the present disclosure. In other words, the present disclosure can be implemented in various forms without departing from the technical concept or major features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-151173, filed Sep. 9, 2020, which is hereby incorporated by reference herein in its entirety.

What is claimed is:

1. An image capturing control apparatus, comprising:
at least one memory storing instructions; and
at least one processor executing the instructions causing the image capturing control apparatus to:
detect a specific object area in an image captured by an image capturing apparatus;
acquire a first input/output characteristic of the image capturing apparatus;
convert the image by acquiring a second input/output characteristic that is an inverse input/output characteristic to the first input/output characteristic, and by applying the second input/output characteristic to the image;
control exposure of the image capturing apparatus based on a luminance value of the specific object area in the converted image; and
store each of a plurality of second input/output characteristics and identification information on a corresponding one of a plurality of image capturing apparatuses in association with each other,
wherein, with no first input/output characteristic of the image capturing apparatus acquired the image is converted by acquiring the second input/output characteristic corresponding to the identification information on the image capturing apparatus, and applying the second input/output characteristic to the image.

2. The image capturing control apparatus according to claim 1, wherein a face area or a human body area is detected as the specific object area in the image.

3. The image capturing control apparatus according to claim 1, wherein the first input/output characteristic is a gamma characteristic, and the second input/output characteristic is an inverse gamma characteristic.

4. The image capturing control apparatus according to claim 1, wherein the at least one processor further causes the image capturing control apparatus,
wherein, with no first input/output characteristic of the image capturing apparatus acquired, to generate the first input/output characteristic based on the luminance value of the specific object area in each of a plurality of images captured by the image capturing apparatus.

5. The image capturing control apparatus according to claim 1, wherein the at least one processor further causes the image capturing control apparatus,
wherein, with no first input/output characteristic of the image capturing apparatus acquired, to control exposure within a predetermined range of which the image capturing apparatus captures a plurality of images, and to generate the first input/output characteristic or the second input/output characteristic based on the luminance value of the specific object area in each of the plurality of images.

6. The image capturing control apparatus according to claim 1,
wherein information on image processing relating to luminance of the image is acquired,
wherein, with the acquired information on image processing relating to luminance of the image, the image is converted by applying an inverse conversion characteristic of a luminance conversion characteristic of the image processing to the image, and
wherein exposure of the image capturing apparatus is controlled based on the luminance value of the specific object area in the converted image.

7. A method for controlling an image capturing apparatus, comprising:
detecting a specific object area in an image captured by the image capturing apparatus;
acquiring a first input/output characteristic of the image capturing apparatus;
converting the image by acquiring a second input/output characteristic that is an inverse input/output characteristic to the first input/output characteristic and applying the second input/output characteristic to the image;
controlling exposure of the image capturing apparatus based on a luminance value of the specific object area in the converted image; and
storing each of a plurality of second input/output characteristics and identification information on a corresponding one of a plurality of image capturing apparatuses in association with each other,
wherein, with no first input/output characteristic of the image capturing apparatus acquired, the image is converted by acquiring a second input/output characteristic corresponding to the stored identification information on the image capturing apparatus, and applying the second input/output characteristic to the image.

8. The method according to claim 7, wherein a face area or a human body area is detected as the specific object area in the image.

9. The method according to claim 7, wherein the first input/output characteristic is a gamma characteristic, and the second input/output characteristic is an inverse gamma characteristic.

10. The method according to claim 7, further comprising generating, without the first input/output characteristic of the image capturing apparatus acquired, the first input/output characteristic is generated based on the luminance value of the specific object area in each of a plurality of images captured by the image capturing apparatus.

11. The method according to claim 7, further comprising, with no first input/output characteristic of the image capturing apparatus acquired:
controlling exposure within a predetermined range of which the image capturing apparatus captures a plurality of images; and
generating the first input/output characteristic or the second input/output characteristic based on the luminance value of the specific object area in each of the plurality of images.

12. The method according to claim 7,
wherein information on image processing relating to luminance of the image is acquired,
wherein, with the acquired information on image processing relating to luminance of the image, the image is converted by applying an inverse conversion characteristic of luminance conversion characteristic of the image processing to the image, and
wherein exposure of the image capturing apparatus is controlled based on the luminance value of the specific object area in the converted image.

13. A non-transitory computer-readable medium storing a program for causing a computer to execute a method comprising:
detecting a specific object area in an image captured by an image capturing apparatus;
acquiring a first input/output characteristic of the image capturing apparatus;
converting the image by acquiring a second input/output characteristic that is an inverse input/output characteristic to the first input/output characteristic and applying the second input/output characteristic to the image;
controlling exposure of the image capturing apparatus based on a luminance value of the specific object area in the converted image; and
storing each of a plurality of second input/output characteristics and identification information on a corresponding one of a plurality of image capturing apparatuses in association with each other,
wherein, with no first input/output characteristic of the image capturing apparatus acquired, the image is converted by acquiring a second input/output characteristic corresponding to the stored identification information on the image capturing apparatus, and applying the second input/output characteristic to the image.

14. The non-transitory computer-readable medium storing a program for causing a computer to execute a method according to claim 13, wherein a face area or a human body area is detected as the specific object area in the image.

15. The non-transitory computer-readable medium storing a program for causing a computer to execute a method according to claim 13, wherein the first input/output characteristic is a gamma characteristic, and the second input/output characteristic is an inverse gamma characteristic.

16. The non-transitory computer-readable medium storing a program for causing a computer to execute a method according to claim 13, further comprising generating, with no first input/output characteristic of the image capturing apparatus acquired, the first input/output characteristic is generated based on the luminance value of the specific object area in each of a plurality of images captured by the image capturing apparatus.

17. The non-transitory computer-readable medium storing a program for causing a computer to execute a method according to claim 13, further comprising, with no first input/output characteristic of the image capturing apparatus acquired:
controlling exposure within a predetermined range of which the image capturing apparatus captures a plurality of images; and
generating the first input/output characteristic or the second input/output characteristic based on the luminance value of the specific object area in each of the plurality of images.

* * * * *